United States Patent [19]

Muller

[11] Patent Number: 5,361,924
[45] Date of Patent: Nov. 8, 1994

[54] TANK CLOSURE

[75] Inventor: Paul W. Muller, Emsworth, England

[73] Assignee: Britax Wingard Limited, England

[21] Appl. No.: 41,270

[22] Filed: Apr. 1, 1993

[30] Foreign Application Priority Data

Apr. 8, 1992 [GB] United Kingdom ............. 9207683.5

[51] Int. Cl.$^5$ ............................................. B65D 41/06
[52] U.S. Cl. ................................. 220/293; 220/295;
220/301; 220/303; 220/304
[58] Field of Search ............... 220/203, 293, 295, 298,
220/299, 301, 302, 303, 304, DIG. 33

[56] References Cited

U.S. PATENT DOCUMENTS

| | | | |
|---|---|---|---|
| 1,887,700 | 11/1932 | Stevens | 220/295 |
| 3,216,608 | 11/1965 | McCormick | 220/295 X |
| 4,000,633 | 1/1977 | Evans | 220/303 X |
| 4,339,055 | 7/1982 | Hutzenlaub | |
| 4,416,391 | 11/1983 | Sarrazin | 220/295 X |
| 4,436,219 | 3/1984 | Reutter | 220/295 |

FOREIGN PATENT DOCUMENTS

| | | |
|---|---|---|
| 2185196 | 12/1973 | France . |
| 2185198 | 12/1973 | France . |
| 2501165 | 9/1982 | France . |
| 2312125 | 3/1973 | Germany . |
| 1394015 | 5/1973 | United Kingdom . |
| 1436634 | 5/1973 | United Kingdom . |
| 2070577 | 9/1981 | United Kingdom . |
| 2096115 | 10/1982 | United Kingdom . |

Primary Examiner—Allan N. Shoap
Assistant Examiner—Jes F. Pascua
Attorney, Agent, or Firm—Davis, Bujold & Streck

[57] ABSTRACT

A closure for the filler pipe of a tank, comprises a gasket mounted in a gasket housing and arranged to engage with a flange on an end of a filler pipe, a cap stem coupled to the gasket housing for relative angular movement about the axis of the filler pipe and having a central portion adapted to project into the filler pipe. A clamp ring carries a pair of clamping lugs adapted to pass through cut-outs in the flange and, after angular movement, to engage under the flange. A spring acts between the stem and the clamp ring to urge the clamping lugs into engagement with the flange. A cam acts between the clamp ring and the gasket housing to hold the clamping lugs out of engagement with the flange until the clamp ring is at a predetermined orientation relative to the gasket housing. A locking ring couples the stem to the clamp ring. The cam is so arranged that, when the clamp ring is in the above-mentioned predetermined orientation relative to the gasket housing, the locking ring disengages the stem from the clamp ring so as to permit relative angular movement and a second cam formation on the locking ring engages with a complementary surface on the clamp ring to wedge the clamping lugs in engagement with the flange.

14 Claims, 3 Drawing Sheets

TANK CLOSURE

FIELD

This invention relates to a closure for the filler pipe of a tank, such as the fuel tank of a motor vehicle, of the type comprising a gasket mounted in a gasket housing and arranged to engage with a flange on an end of a filler pipe, a cap stem coupled to the gasket housing for relative angular movement about the axis of the filler pipe and having a central portion adapted to project into the filler pipe, a clamp ring carrying a pair of clamping lugs adapted to pass through cut-outs in the flange and, after angular movement, to engage under the flange, spring means acting between the stem and the clamp ring for urging the clamping lugs into engagement with the flange, camming means acting between the clamp ring and the gasket housing and operative to hold the clamping lugs out of engagement with the flange until the clamp ring is at a predetermined orientation relative to the gasket housing, and coupling means operating to couple the stem to the clamp ring for simultaneous angular movement.

A tank cap of this type suffers from the disadvantage that, when closed, it is held in its fully closed position only by the aforesaid spring means. Consequently, a sufficient force acting outwardly to displace the cap against the action of this spring can cause disengagement of the gasket from the flange. The present invention aims to provide a cap which is not subject to this disadvantage.

SUMMARY OF THE INVENTION

According to the invention, in a tank closure of the type described above, the camming means is so arranged that, when the clamp ring is in the orientation relative to the gasket housing such as to permit engagement of the clamping lugs with the flange, the coupling means disengages the stem from the clamp ring so as to permit relative angular movement and a second cam formation on the coupling means engages with a complementary surface on the clamp ring to wedge the clamping lugs in engagement with the flange.

DETAILED DESCRIPTION OF THE PREFERRED EMBODIMENT

Figure 1:
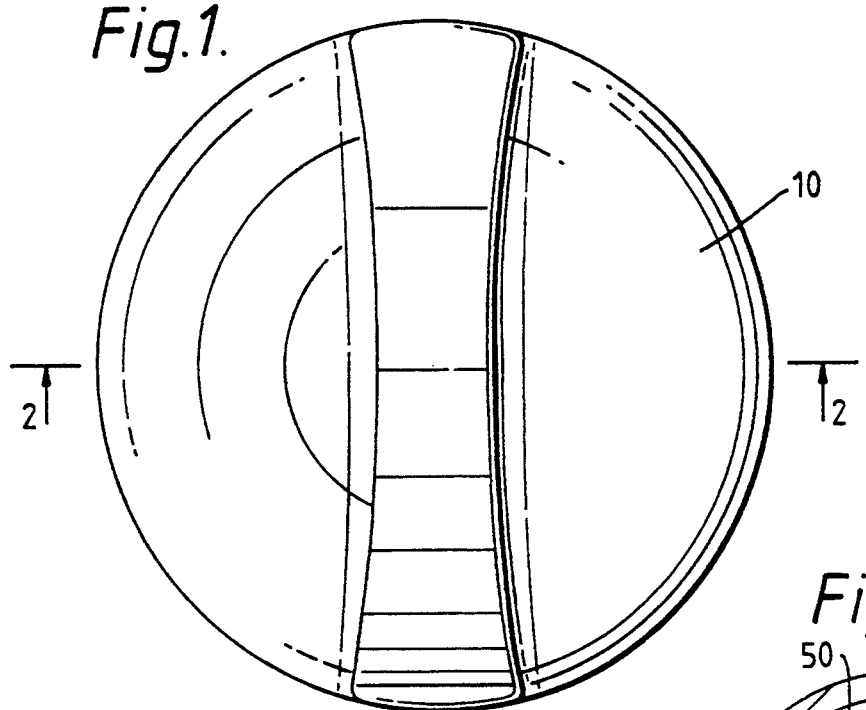
FIG. 1 is a plan view of a tank closure in accordance with the invention, oriented for insertion into and removal from a tank filler pipe.
Figure 3:
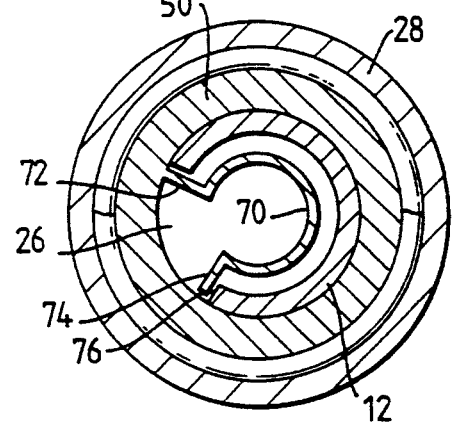
FIG. 3 is a cross-sectional view taken on the line 3—3 in FIG. 2.
Figure 2:
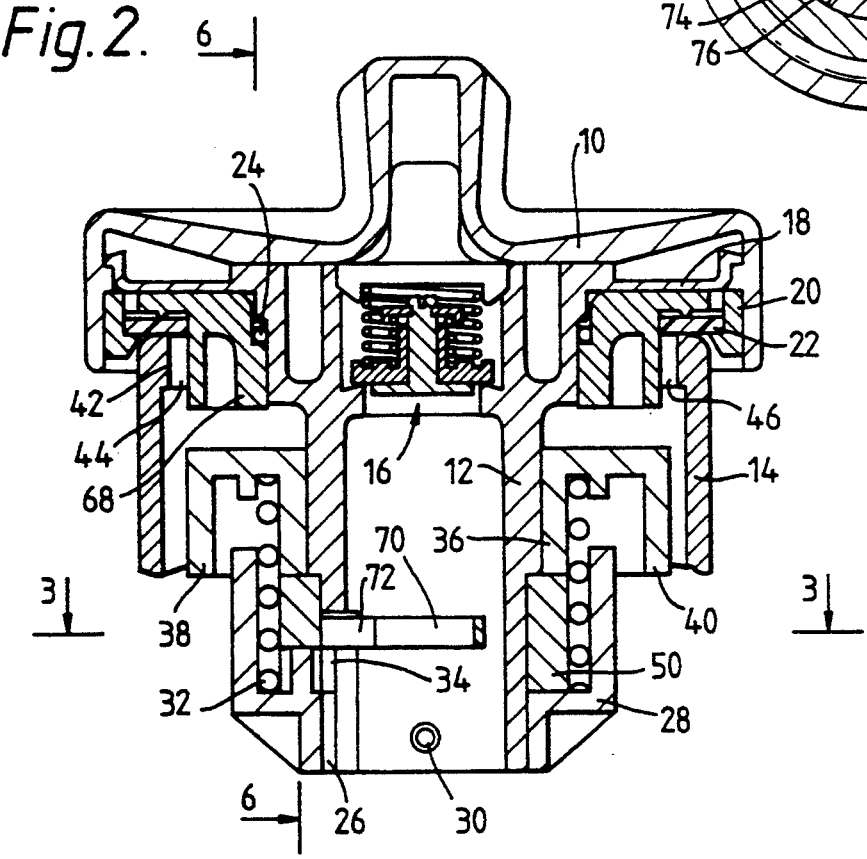
FIG. 2 is a cross-sectional view taken on the line 2—2 in FIG. 1, also showing the end of the tank filler pipe.

FIGS. 1 to 3 show a fuel cap assembly having a cap 10 which is rigidly secured to a hollow cylindrical stem 12 which projects down a fuel tank filler pipe 14. At its outer end, the stem 12 has a vent assembly 16 which is arranged to relieve any excess fluid pressure difference across the cap. The vent assembly 16 is of conventional design and will not be described in detail.

The stem 12 has an outwardly directed flange 18 which projects over the end of the filler pipe 14 and which carries an annular gasket housing 20 which supports a sealing gasket 22. The gasket 22 can engage with the end of the filler pipe 14 and an O-ring 24 seals the gasket housing 22 to the stem 12 while allowing relative angular movement.

At its inner end, furthest from the cap 10, the stem 12 has a quadrant 26 cut away. An annular cap 28 is fitted round the bottom end of the stem 12 and secured by a dowel 30 so as to form a pocket for a compression spring 32. The bottom of the pocket for the spring 32 is below the top of the cut out quadrant 26 so as to leave a window 34.

Journalled on the stem 12 is a clamp ring 36 which carries two outwardly directed clamping lug 38 and 40. The end of the filler pipe 14 has a flange 42 with two cut-outs 44 and 46 which are larger than the lugs 38 and 40 so as to permit insertion and removal of the cap when it is oriented as shown in FIGS. 1 and 2, with the lugs 38 and 40 in alignment with the cut-outs 44 and 46. The compression spring 32 engages with the clamp ring 36 so as to bias it towards the flange 42 on the end of the filler pipe 14 but is held down by a retention mechanism which will be described below.

Figure 4:
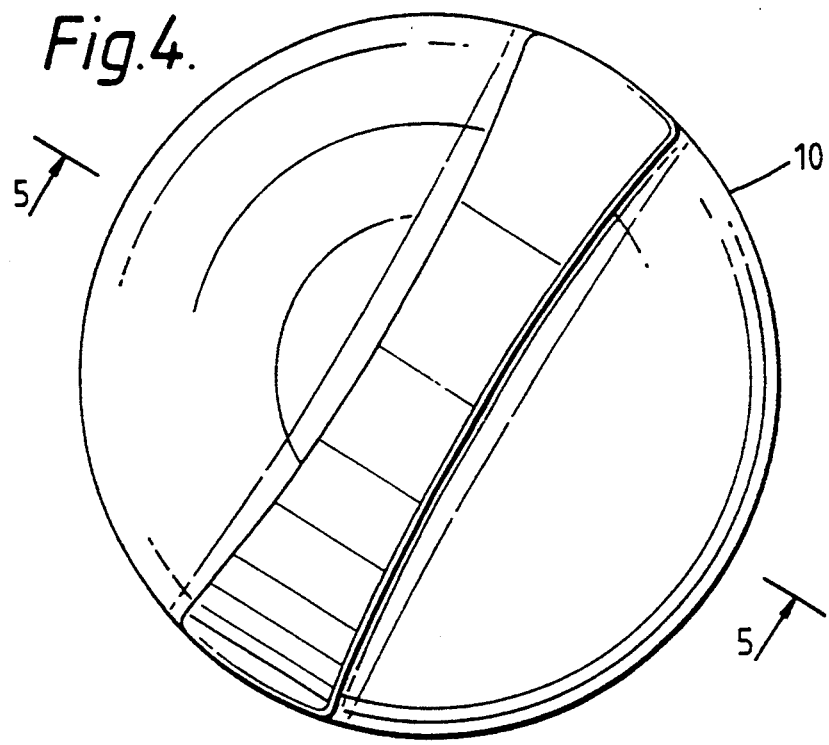
FIG. 4 is a plan view of the tank closure shown in FIGS. 1 to 3, in the orientation in which it is secured in the tank filler pipe.
Figure 5:
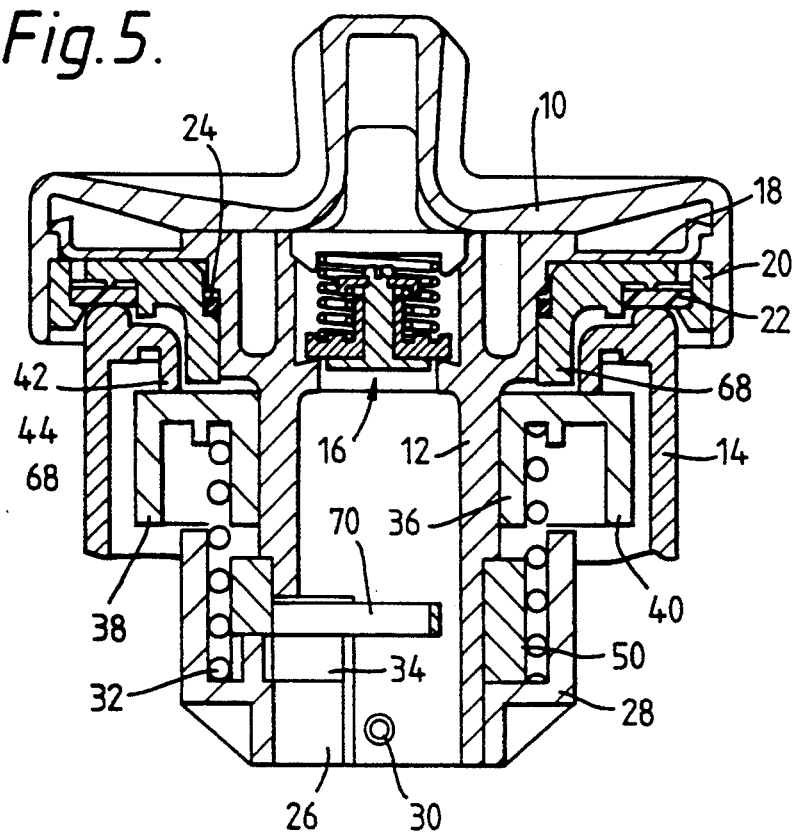
FIG. 5 is a cross-sectional view taken on the line 5—5 in FIG. 4, also showing the end of the tank filler pipe.

If the cap is turned clockwise through about 30°, to the orientation shown in FIGS. 4 and 5, the lugs 38 and 40 are out of alignment with the cut-outs 44 and 46. On release of the retention mechanism, the compression spring 32 biases the lugs 38 and 40 into engagement with the underside of the flange 42.

Figure 6:
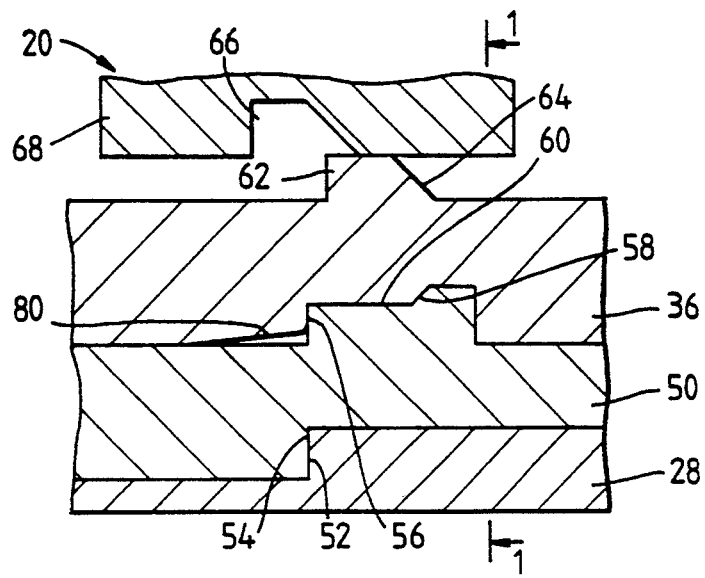
FIG. 6 is a scrap cross-sectional view taken on the line 6—6 in FIG. 2, with the mechanism in the orientation just prior to engagement with the clamping lug of the flange.
Figure 7:
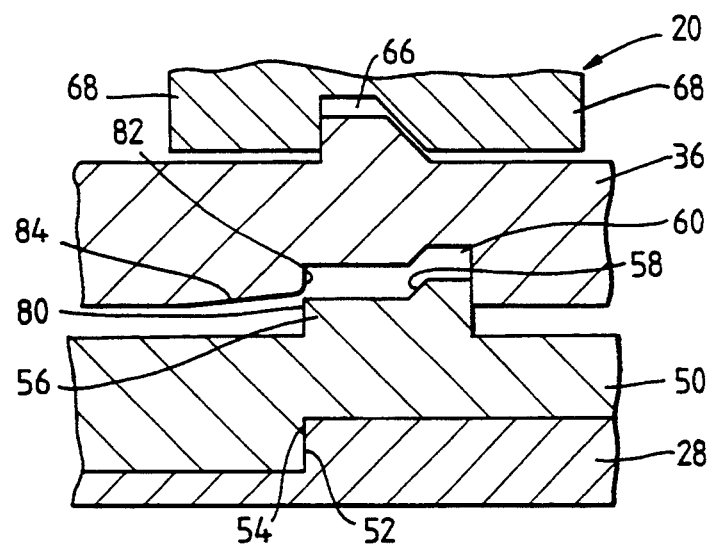
FIG. 7 is a scrap cross-sectional view similar to FIG. 3, but with the mechanism in the position in which the clamping lug are engaged with the flange, and the coupling means is freed to move into its wedging position.
Figure 8:
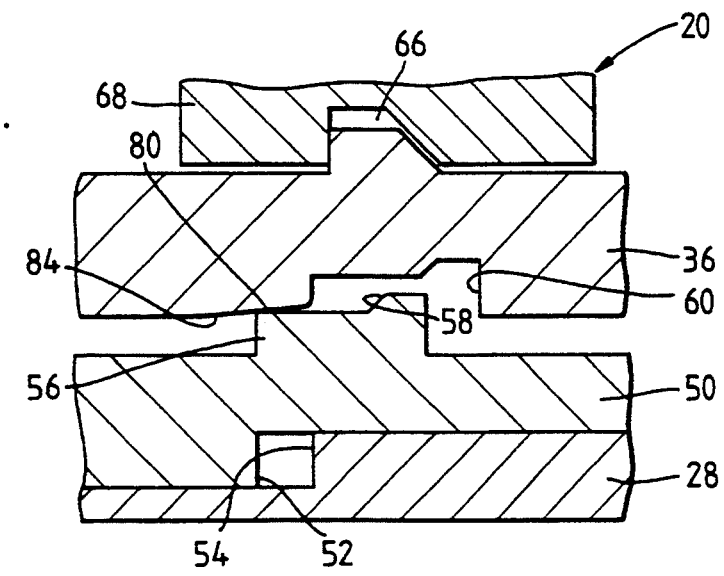
FIG. 8 is a scrap cross-sectional view, similar to FIGS. 3 and 4, but with the coupling means in its wedging position.

The retention mechanism includes a locking ring 50 located between the bottom of the pocket in the annular cap 28 and the clamp ring 36. Referring to FIGS. 6 to 8, the locking ring 50 has a drive step 52 on its bottom face which is engaged by a complementary step formation 54 on the annular cap 28. The upper surface of the locking ring 50 carries a cam projection 56, which has an additional ramped projection 58 at one end and which, in FIG. 6, is shown as received in a complementary recess 60 in the bottom surface of the clamp ring 36. The top surface of the clamp ring 36 carries a cam projection 62 which has a ramp 64 on its right hand end, as viewed in FIG. 6, and which is shown in FIG. 7 as received in a complementary recess 66 in the bottom surface of a downwardly extending annular flange 68 on the gasket housing 20.

Reverting to FIG. 3, the locking ring 50 has an integrally formed two-legged leaf spring 70 formed so as to project through the window 34 into the interior of the stem 12 with one leg 72 fast with the adjacent inner wall of the locking ring 50 and the other leg 74 spaced apart therefrom when in the relaxed state.

When the cap is to be inserted into the end of the filler pipe 14, its components are in the relative orientations illustrated in FIGS. 1 to 3 and 6. The lug 38 and 40 are inserted through the cut-outs 44 and 46 respectively and the cap 10 is then turned through approximately 30° as described above. This angular movement is communicated by the abutting faces 52 and 54 to the locking ring 50, thence by the abutting faces of the projection 56 and recess 60 to the clamp ring 36 and thence by the projection 62 and recess 66 to the clamp ring 36. During this movement, the leg 74 of the leaf spring 70 is engaged by an edge 76 of the quadrant 26 and is thereby compressed into close proximity with the fixed leg 72.

Continued angular movement of the cap 10 and stem 12 causes the projection 62 on the upper surface of the clamp ring 36 to slide along the bottom of the flange 68 on the gasket housing 20 until it comes into alignment with the recess 66, whereupon the clamp ring 36 is allowed to move towards the gasket housing 20 under action of the compression spring 32. This movement clamps the flange 42 between the lugs 38 and 40 and the gasket 22, and also disengages the projection 56 from the recess 60 as shown in FIG. 7.

As soon as the edge 80 of the projection 56 is clear of the corresponding edge 82 of the recess 60, the locking ring 50 springs to the left, as viewed in FIG. 7, under the action of the leaf spring 70 so that the edge 80 wedges under a ramp surface 84 adjacent to the edge 82, thereby preventing compression of the spring 36 and separating movement of the clamp ring 36 and gasket housing 20.

When the cap is to be removed, it is turned in the anti-clockwise direction as viewed in FIGS. 1 and 3, until the other end 86 of the quadrant 26 abuts against the static leg 72 of the leaf spring 70, moving the locking ring 50 back to the position shown in FIG. 7 in which the projection 56 abuts against the right hand end of the recess 60. Continued angular movement causes the ramp 64 to force the clamp ring 36 and the flange 68 on the gasket housing 20 apart and back to the position shown in FIG. 6, in which the force of the compression spring 32 urging the gasket 22 into engagement with the end of the filler pipe 14 is relieved and the cap 10 can be removed.

I claim:

1. A closure for the filler pipe of a tank, comprising a gasket mounted in a gasket housing and arranged to engage with a flange on an end of a filler pipe,
a cap stem coupled to the gasket housing for relative angular movement about the axis of the filler pipe and having a central portion adapted to project into the filler pipe,
a clamp ring carrying a pair of clamping lugs adapted to pass through cut-outs in the flange and, after angular movement, to engage under the flange,
coupling means operating to couple the stem to the clamp ring for simultaneous angular movement,
spring means acting between the stem and the clamp ring for urging the clamping lugs into engagement with the flange, camming means acting between the clamp ring and the gasket housing and operative to hold the clamping lugs out of engagement with the flange until the clamp ring is at a predetermined orientation relative to the gasket housing and then to cause the coupling means to disengage the stem from the clamp ring so as to permit relative angular movement, and
a second cam formation on the coupling means arranged to engage with a complementary surface on the clamp ring to wedge the clamping lugs in engagement with the flange when the clamping lugs engage with the flange.

2. A closure according to claim 1, wherein the second cam formation is formed on a projection on the coupling means which is retained in a recess in the clamp ring while the camming means holds the clamping lugs out of engagement with the flange and which moves out of said recess to allow the second cam formation to engage with the complementary surface when the clamp ring is at a predetermined orientation relative to the gasket housing.

3. A closure according to claim 2, wherein the coupling means comprises a locking ring journaled on the stem.

4. A closure according to claim 3, wherein the locking ring is coupled to the stem by means allowing limited relative angular movement and second spring means is arranged to bias the coupling means into its wedging position.

5. A closure according to claim 4, wherein the means allowing limited relative angular movement comprises a segmental slot formed in the stem in alignment with the locking ring and the second spring means comprises a spring engaging between the locking ring and an end of the segmental slot.

6. A closure according to claim 3, wherein the locking ring has an abutment projection on its surface furthest from the gasket housing, and a drive formation is secured to the stem and adapted to engage with the abutment projection.

7. A closure according to claim 4, wherein the locking ring has an abutment projection on its surface furthest from the gasket housing, and a drive formation is secured to the stem and adapted to engage with the abutment projection.

8. A closure according to claim 5, wherein the locking ring has an abutment projection on its surface furthest from the gasket housing, and a drive formation is secured to the stem and adapted to engage with the abutment projection.

9. A closure according to claim 1, wherein the coupling means comprises a locking ring journaled on the stem.

10. A closure according to claim 9, wherein the locking ring is coupled to the stem by means allowing limited relative angular movement and second spring means is arranged to bias the coupling means into its wedging position.

11. A closure according to claim 10, wherein the means allowing limited relative angular movement comprises a segmental slot formed in the stem in alignment with the locking ring and the second spring means comprises a spring engaging between the locking ring and an end of the segmental slot.

12. A closure according to claim 9, wherein the locking ring has an abutment projection on its surface furthest from the gasket housing, and a drive formation is secured to the stem and adapted to engage with the abutment projection.

13. A closure according to claim 10, wherein the locking ring has an abutment projection on its surface furthest from the gasket housing, and a drive formation is secured to the stem and adapted to engage with the abutment projection.

14. A closure according to claim 11, wherein the locking ring has an abutment projection on its surface furthest from the gasket housing, and a drive formation is secured to the stem and adapted to engage with the abutment projection.

* * * * *